March 8, 1966 R. L. SOHN 3,239,165
ATTITUDE CONTROL SYSTEM AND APPARATUS
Filed July 30, 1962 3 Sheets-Sheet 1
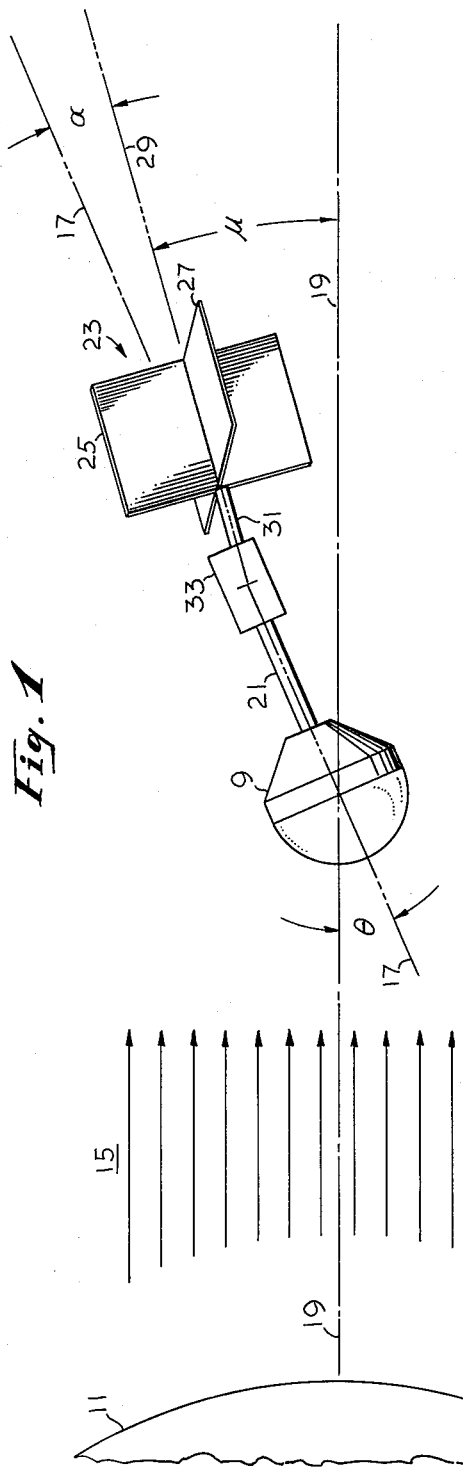
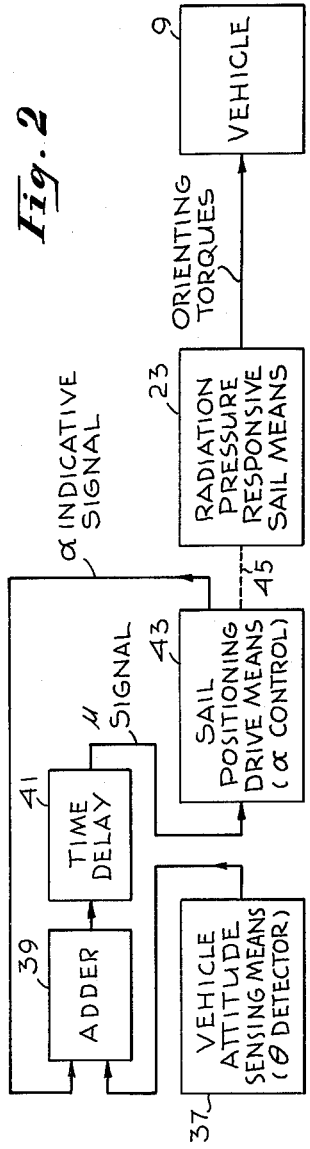
ROBERT L. SOHN
INVENTOR.
BY
ATTORNEY

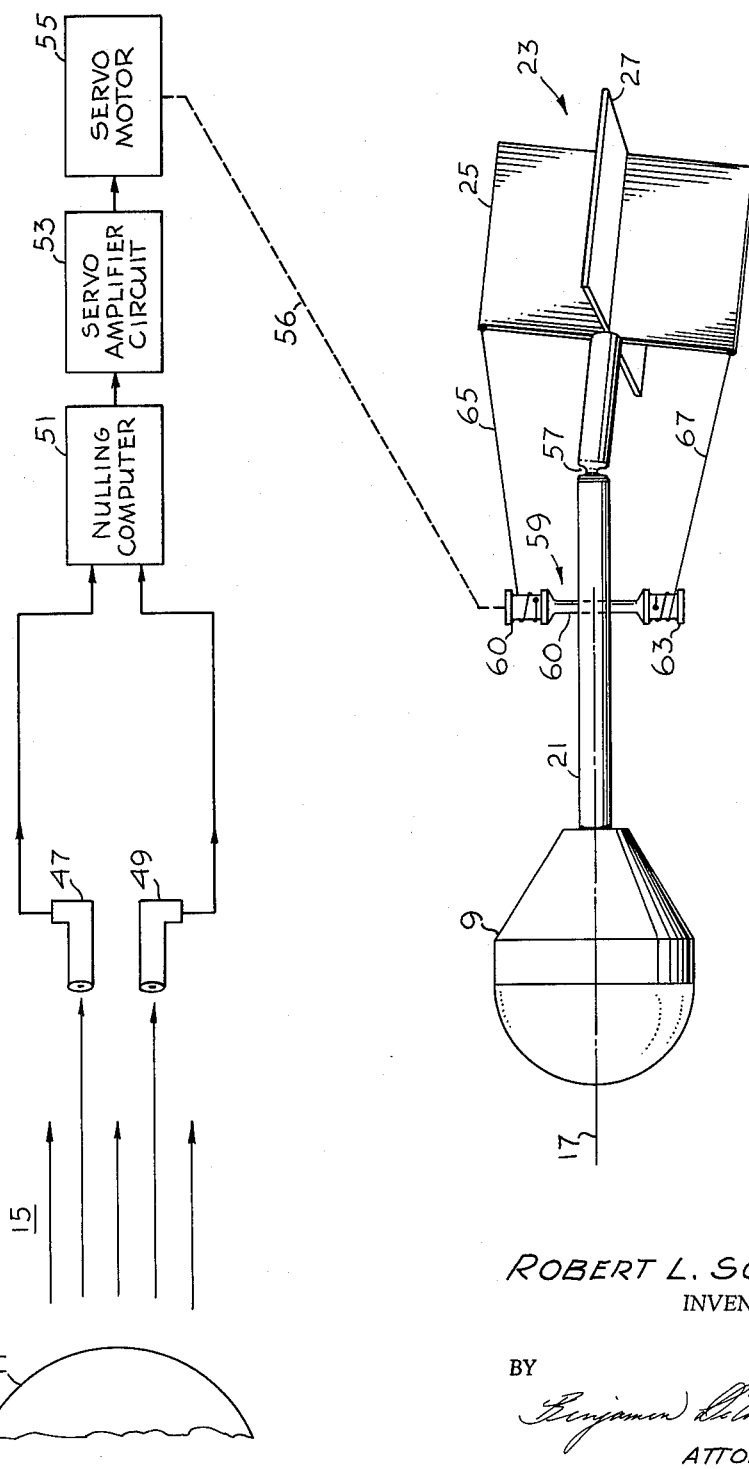

March 8, 1966  R. L. SOHN  3,239,165
ATTITUDE CONTROL SYSTEM AND APPARATUS
Filed July 30, 1962  3 Sheets-Sheet 3
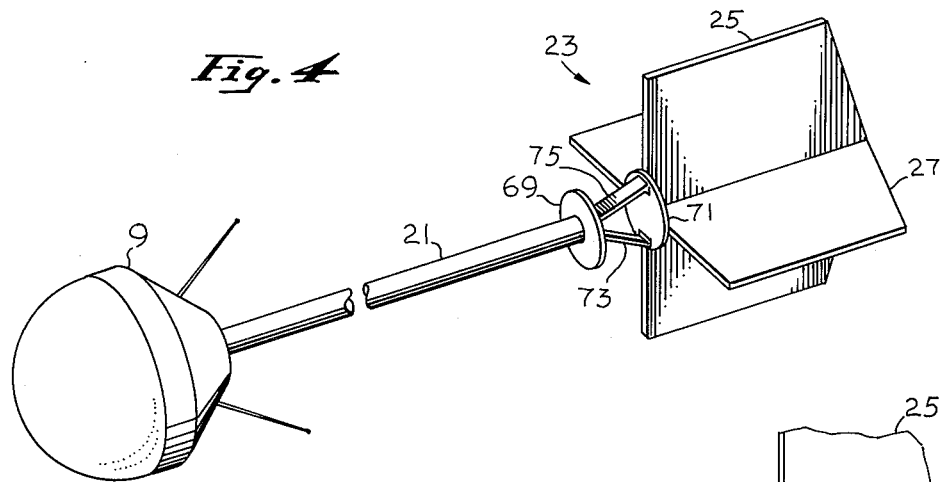
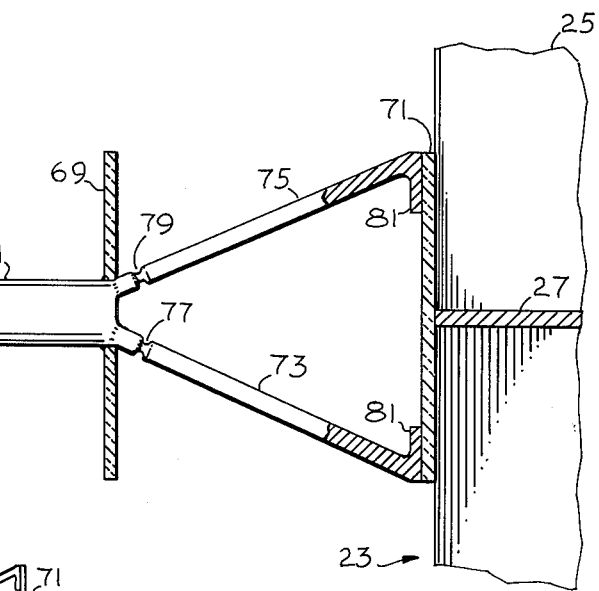
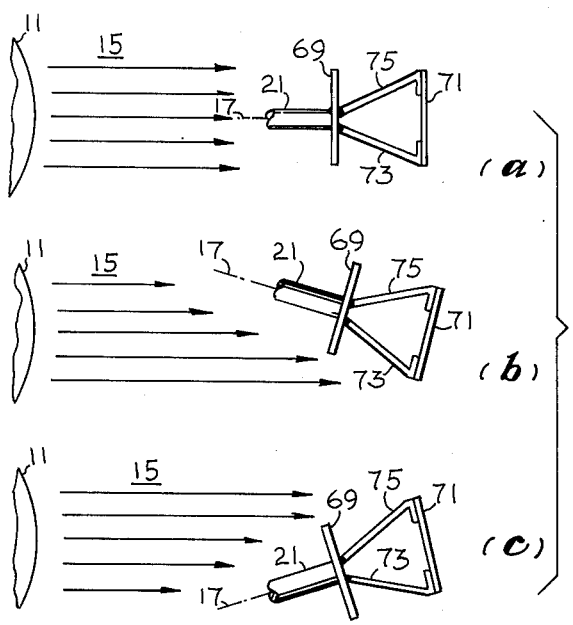
ROBERT L. SOHN
INVENTOR.
BY
ATTORNEY

United States Patent Office 3,239,165
Patented Mar. 8, 1966

3,239,165
ATTITUDE CONTROL SYSTEM AND APPARATUS
Robert L. Sohn, Santa Monica, Calif., assignor, by mesne assignments, to TRW Inc., a corporation of Ohio
Filed July 30, 1962, Ser. No. 213,501
13 Claims. (Cl. 244—1)

This invention relates to apparatus for stabilizing the attitude of an object by means of radiation pressure and more specifically to improved space vehicle stabilization apparatus which includes one or more solar radiation responsive elements and a system capable of generating corrective torques for stabilizing the vehicle against disturbing torques such as gravitational eccentricities, meteorite impingement, solar radiation pressures, and the like. One apparatus of the general class to which the present invention relates is described in my Technical Paper entitled, "Stabilization of Space Vehicles by Means of Gas Diffusing Surfaces," American Astronautical Society, Sheraton-Palace Hotel, San Francisco, California, August 1961.

One very difficult problem confronting the designer of long duration space flight vehicles is that of controlling and stabilizing the orientation of the vehicle for long periods of time. For example, it might be desirable to orient a communications satellite or elements thereof in a given direction and maintain that direction. Or, during lunar or interplanetary flights, it might be required to maintain a constant attitude for various reasons. Now if disturbing torques such as solar radiation pressures or gravitational torques cause the vehicle to rotate away from the desired orientation, a suitable corrective torque must be applied to right the vehicle. Generally, in the prior art a fluid jet or magnetic torque producing device of some type has been used to supply the required restoring moment. Even though the disturbing torques are small, it is readily apparent that fluid jets cannot be used for long periods of time without consuming large quantities of propellant material.

The above noted American Astronautical Society Paper outlines two specific limitations or problems which are associated with all basic solar sail attitude stabilization systems. The first problem is that solar sails generally are capable of producing only limited torques of about the same order of magnitude as the disturbing torques which may be encountered. The second problem is that the usual solar-sail-equipped vehicle is neutrally stable, that is, if disturbed from a desired orientation, the entire vehicle and system will tend to oscillate with undiminishing amplitude about the desired orientation.

Having in mind the aforementioned limitations of prior art attitude control systems, it is a primary object of my invention to provide an attitude stabilization system which can be used for very long periods of time, such as several months or years, without necessitating an undesirably large system weight.

It is another object of my invention to provide an attitude stabilization system which is capable of providing corrective forces considerably greater than those provided by previous radiation pressure responsive stabilizing systems.

It is a further object of my invention to provide a space vehicle attitude stabilizing system which obviates the oscillatory tendency of previous solar radiation pressure responsive stabilizing systems.

It is an additional object of my invention to provide a system of the type described which is both statically and dynamically stable.

It is a general object of my invention to provide a space vehicle attitude stabilizing system that is completely passive, deriving its energy from the sun, acting as its own sensor, and creating a restoring force proportional to the disturbance angle without benefit of gears, electronics, sliding parts, motors, valves, or the like.

It is another general object of my invention to provide a system of the type described which avoids the use of complex electronic and electrical circuitry.

It is a further general object of my invention to provide a dynamically stable space vehicle attitude stabilizing system of reduced mass, bulk, and complexity.

The foregoing objects and others ancillary thereto I prefer to accomplish as follows:

In accordance with the preferred embodiments of my invention, an object to be oriented, such as a space vehicle, is provided with an electromagnetic radiation pressure responsive solar sail means for applying torques to the spacecraft in response to transaxial impingement of radiation from a source such as the sun or another star. As stated heretofore, a system including such a solar sail has a tendency to oscillate between opposite angularly displaced orientations relative to the radiation line from the sun to the object. My invention overcomes that tendency by providing a sensing means for generating a signal corresponding to the degree of misalignment or misorientation of the spacecraft and providing anti-hunt control means responsive to that signal for angularly displacing the solar sail relative to the axis of the spacecraft. The system is preferably constructed and arranged so that such angular displacement of the solar sail, as a function of time, lags in phase relative to the time function misalignment of the spacecraft. That arrangement very substantially alleviates the tendency of the system to oscillate and in a preferred embodiment can completely eliminate such oscillation.

The novel features that I consider characteristic of my invention are set forth with particularity in the appended claims. The invention itself, however, both as to its organization and its method of operation together with additional objects and advantages thereof, will best be understood from the following description of specific embodiments when considered in connection with the accompanying drawing, in which:

FIGURE 1 is a schematic illustration of a space vehicle embodying the present invention and illuminated by electromagnetic radiation from the sun, FIGURE 2 is a block schematic diagram useful in explaining the operation of the system and apparatus of FIGURE 1;

FIGURE 3 is a more detailed diagrammatic illustration of one implementation of the present invention;

FIGURE 4 is a perspective view of a still further embodiment;

FIGURE 5 is a cross-sectional view taken along the axis of symmetry of the apparatus of FIGURE 5; and FIGURES 6a, 6b, and 6c are line diagrams to illustrate various conditions of operation of the apparatus illustrated by FIGURES 4 and 5.

To overcome the problems mentioned above, a spacecraft attitude control system must have at least two totally distinct and not readily compatible characteristics; it must have attitude distribution or error without inducing or continued attitude oscillation; and it must be of minimum bulk, weight, and complexity. Preferably, it should be free of electrical circuits and should not use bearings or other metal-to-metal relatively moving components.

Accordingly, referring to FIGURES 1 and 2 of the drawing, the system of my invention is constituted by a vehicle or spacecraft 9 disposed in a position in space such that it is illuminated by a beam of electromagnetic radiation 15 emanating from the sun 11. The radiation direction or radiation line from the sun or radiation source 11 to the spacecraft 9 is indicated by central axis 19 extending from the sun 11 through the center of inertia of the vehicle 9. A predetermined axis of the spacecraft is indicated by the numeral 17. While, in the configuration illustrated, the axis 17 is the axis of symmetry of the spacecraft 9, it should be understood that such is not necessarily the case but that any axis of the spacecraft might be selected as the axis which is desired to be oriented parallel to the electromagnetic rays 15. As shown in FIGURE 1, the spacecraft 9 has an orientation corresponding to an arbitrary amount of misalignment from the desired orientation. That is, the misalignment is indicated by the angle $\theta$ subtended between the spacecraft axis 17 and the radiation line 19. Spaced from the vehicle 9 and supported relative thereto by means of spacecraft boom 21 there is provided a solar sail assembly including a first sail panel 25 and second sail panel 27 which are disposed at right angles to one another and which intersect with one another along an axis 29 which may be conveniently referred to as the axis of symmetry of the sail assembly. In accordance with the broad concepts of the present invention, the sail panels 25 and 27 may be formed of any lightweight radiation reflecting material. In preferred embodiments, the sail panels preferably take one of the specific forms disclosed in my co-pending applications Serial Number 213,500, Filed July 30, 1962 now U.S. Pat. No. 3,173,626 and Serial Number 213,418, Filed July 30, 1962. The sail assembly 23 is carried by a sail supporting boom 31 which is deflectable relative to the spacecraft boom 21 through the operation of a control system 33, indicated in FIGURE 1 in block diagram form, for dynamically positioning the assembly 23 relative to the spacecraft axis 17. By operation of the control system 33, the sail assembly may be deflected or angulated relative to the axis 17 so that an angle $\alpha$ is subtended between the sail assembly axis 29 and the spacecraft axis 17. As shown in FIGURE 1, the sail assembly misalignment angle $\mu$ plus the sail displacement angle $\alpha$ equals the spacecraft misalignment angle $\theta$. The operation of the system shown in FIGURE 1 may be best understood by consideration of FIGURE 2. FIGURE 2 is a block diagram representation of the system of FIGURE 1 including, in greater detail, the various functional components of the control system 33. Specifically, the control system includes a vehicle attitude sensing means or $\theta$ detector 37 which responds to the orientation of the vehicle 9 relative to the impinging solar rays 15 to produce a $\theta$ signal indicative of the vehicle attitude. The vehicle attitude sensing means 37 may be, for example, any one of various photoelectric or heat responsive systems which are well known in the electronic arts. More specifically, the sensing means 37 may be constructed generally as disclosed by United States Patent No. 2,424,976 issued August 5, 1947 or as disclosed by United States Patent No. 2,422,971 issued June 24, 1947. The $\theta$ representative output signal from sensing means 37 is applied to a first input of an adder circuit 39, to a second input of which there is applied an $\alpha$ representative signal from an output of a sail positioning drive means 43. The drive means 43 is essentially an actuating apparatus for physically altering the angle between the spacecraft boom 21 and the sail supporting boom 31. Thus, the drive means 43 may be conveniently regarded as a means for controlling the angle $\alpha$. Since the primary function of the drive means is to control the angle $\alpha$, it will be readily apparent that an output signal representative of the angle $\alpha$ may be derived therefrom by conventional means. The adder means 39 combines the $\alpha$ representative and $\theta$ representative signals to provide an output quantity representative of the sail misalignment angle $\mu$. This $\mu$ representative signal is fed through a time delay means to the input of the sail positioning drive means 43 which operates in response to the $\mu$ signal input to mechanically control the sail position through a mechanical coupling 45. It will be appreciated that the second position sail means 23 consequently generates a torque in response to impingement of the radiation 15 with the torque amplitude being dependent upon the sail displacement angle $\mu$. That torque is applied to the space vehicle 9 by way of the spacecraft boom 21 and causes rotational acceleration of the vehicle 9 about the center of inertia of the entire system. Now supposing that the vehicle has been so accelerated and is turning in a direction (clockwise) to reduce the angles $\theta$ and $\mu$, as the angle $\theta$ decreases, the control system as shown in FIGURE 2 operates automatically to continuously alter the angle $\alpha$ in accordance with a predetermined function of the angle $\theta$. In a preferred embodiment the system is arranged so that the angle $\alpha$ lags behind the angle $\theta$ as a function of time. That is, when the spacecraft axis 17 comes into precise alignment with the radiation direction as indicated by the axis 19, it will be appreciated that the spacecraft has a finite rotational velocity. If the angle $\alpha$ came to zero at the same time that $\theta$ becomes zero, the spacecraft would continue its clockwise rotation until the sail assembly was sufficiently misaligned in the opposite direction to provide enough counter torque to overcome the existing moment. By constructing and arranging the system so that the angle $\alpha$ has a positive value when $\theta$ becomes zero (i.e., $\alpha$ lags behind $\theta$), the sail assembly 23 will be slightly deflected downwardly from the radiation line 19 when the spacecraft axis 17 is aligned with the radiation line 19. With the downward deflection $\alpha$ of the sail assembly having a finite value proportional to the rotational velocity of the spacecraft at the time when $\theta$ reaches zero, the solar rays 15 will strike the lower side of the sail panel 27 and the sail assembly will thereby provide a counterclockwise torque just sufficient to dynamically stabilize the spacecraft at a $\theta$ equal-to-zero orientation. To enable a more complete understanding of the control system, there is shown in FIGURE 3, in more detail, one exemplary form which the control system may take. In this embodiment the electromagnetic rays 15 from the sun 11 are collected or detected by a pair of photoelectric cells 47 and 49 which produce electrical signals indicative of the yaw angle or misalignment angle $\theta$ of the spacecraft. The electrical currents or signals from detectors 47 and 49 are fed to and combined within a nulling computer 51 which operates in response to those input signals to provide an output signal or current representative of the angle $\theta$. In addition, if so desired, the computer 51 may be arranged to detect the rate of change of the angle $\theta$ and to incorporate in its output signal a component or factor corresponding to the rate of change of the spacecraft misalignment. This $\theta$ representative signal is fed through a conventional servoamplifier circuit 53 to a servomotor 55 which actuates a mechanical linkage 56 to rotate a cable winching mechanism 59. In accordance with this embodiment, the winching mechanism 59 comprises a shaft 60 extending laterally through the spacecraft boom 21 and journalled thereon. At its opposite ends the shaft 60 carries a pair of cable drums 61 and 63 to which are attached a pair of guy wires or cables 65 and 67. The opposite or right-hand ends of the cables 65 and 67 are respectively attached to the upper and lower extremities of the sail panel 25. Intermediate the point at which the shaft 60 is journaled and the sail assembly 23, the spacecraft boom 21 is provided with a flexible portion 57 which preferably is simply a necked-down portion having a sufficiently small cross-sectional area to permit a few degrees of angular displacement of the sail assembly 23 relative to the vehicle axis 17. It will be appreciated that the flexure portion 57 might, if desired, be comprised of a conventional universal joint or any one of various other flexible, structural arrangements which are well known in the mechanical arts. However, in embodiments of the present invention which are intended to be operated in outer space, the necked-down metallic type of flexure means is definitely preferable in that it avoids the lubrication problems which occur when metal-tometal moving joints are used in the vacuum of outer space.

The system illustrated in FIGURE 3 operates generally in the same manner as described heretofore with reference to FIGURES 1 and 2. That is, the servomotor 55 in response to θ representative signals, supplied from the detectors 47 and 49 by way of the computer 51 and the servo-amplifier 53, continuously adjusts the rotational position of the shaft 60 and thereby continuously controls the displacement angle α of the sail assembly. The displacement angle α in turn determines the amplitude and direction of the torques which are supplied to the vehicle by the sail assembly. These torques accordingly operate to reposition the vehicle and thereby alter the amplitude and rate of change of the spacecraft misalignment angle θ. Although not so illustrated in FIGURE 3, the system can be arranged, if desired, to provide a finite angle α dependent upon the rate of change of θ at the time when the angle θ passes through zero. By that arrangement the system becomes dynamically stable and operates to maintain the spacecraft axis 17 in precise alignment with the radiation line 19. The embodiment just described has been disclosed to enable a ready and complete understanding of the basic concepts and the operation of systems in accordance with my invention. It is not, however, the presently preferred embodiment.

FIGURES 4, 5, and 6 illustrate the arrangement which I presently consider the preferred form of my invention. Referring to FIGURE 4, the payload or spacecraft 9 is provided with an elongated spacecraft boom 21 for supporting the sail assembly 23 at an appreciable distance from the center of gravity of the spacecraft. In accordance with this embodiment of the invention, the sail assembly 23 is supported by and secured to a preferably circular plate 71 of a material of low heat conductivity. The plate 71 is connected to the end of the boom 21 by four thermally sensitive metal straps. For clarity of illustration, only two of the four straps or links 73 and 75 are shown in FIGURES 4 and 5; however, it will be appreciated that an additional pair of links (not shown) is necessary and intended. The additional pair of links are identical to links 73 and 75 but are arranged to lie generally in the plane of sail member 27 rather than in the plane of member 25. Accordingly, the configuration shown in FIGURE 5 may be considered as representing a section taken either in the plane of sail member 25 or along the plane of member 27. As best shown in FIGURE 5, the insulative plate 71 is rigidly and securely attached to the sail assembly 23. To the opposite side of the plate 71 there are secured four separate and thermally isolated pads 81 to which the thermally sensitive links 73 and 75 are rigidly attached, for example, as by welding. The links 73 and 75 extend from the separate pads 81 in a nonparallel manner and are attached to the end of the spacecraft boom 21, thus forming a trapezoid consisting of parallel sides 71 and 21 and nonparallel sides consisting of the links 73 and 75. The link 73 is provided with a necked-down flexure portion 77 to enable angular displacement of the main body of the link 73 relative to the boom 21. The second thermally sensitive link 75 is provided with a similar flexure joint 79. A sun shield 69 in the form of a circular disc of insulative material is provided around the end of the boom 21 adjacent the connection of the same to the links 73 and 75. This sun shield operates to prevent impingement of the solar radiation on the links 73 and 75 when the system is precisely aligned with the solar rays falling thereon. Thus, when the axis of symmetry of the system of FIGURE 5 is aligned with the solar rays, both link 73 and link 75 are at a minimum temperature and at the same temperature. The foregoing corresponds to the operative condition illustrated in FIGURE 6a. In this condition substantially all of the radiation beam 15 is stopped by the sun shield 69 so that only a minimal portion of the radiation impinges on the outermost ends of the links 73 and 75. A different condition of misalignment is shown in FIGURE 6b wherein the radiation from the sun 11 is falling on a substantial portion of the link 73 and the link 75 is completely shaded by the shield 69. When this operative condition obtains, link 73 is heated and expands longitudinally thereby deflecting the lower edge of the plate 71 to the right and thereby deflecting the sail assembly 23 upwardly relative to the axis 17 of the spacecraft. The opposite operative condition is shown in FIGURE 6c wherein the thermally sensitive link 75 is heated by the radiation beam 15 and expands longitudinally to deflect the plate 71 and therefore the entire sail assembly 23 in a clockwise direction. From the foregoing it will be appreciated that the trapezoidal arranged linkage comprising elements 73, 75, and 71 operates as sensing means for providing a signal proportional to the degree of misalignment of the vehicle and simultaneously operates as means responsive to that signal for angularly displacing the sail assembly relative to the axis of the vehicle. Since the links 73 and 75 can cool only by conduction to the sail assembly and by a small amount of radiation into space, it will be appreciated that they retain their heat to some extent and thereby the system has an inherent lag so that the angle α provided by longitudinal expansion of the links continuously lags behind variations in the angle θ as a function of time.

For a full and detailed mathematical analysis and further expansion of the operative characteristics of my invention as described heretofore, reference may be had to my previously mentioned Technical Paper entitled, "Stabilization of Space Vehicles by Means of Gas Diffusing Surfaces." It is intended that said Article is incorporated by reference herein.

While the present invention has been illustrated and described with reference to certain preferred embodiments only, it will be obvious to those skilled in the art that it is not so limited but is susceptible of various changes and modifications without departing from the spirit and scope thereof.

The embodiments of the invention in which an exclusive property or privilege is claimed are defined as follows:

1. An attitude control arrangement comprising:
   an object which is desired to be maintained in a predetermined orientation relative to a beam of electromagnetic radiation;
   radiation sail means coupled to control the orientation of said object for applying thereto an attitude altering force in response to transaxial impingement of said radiation;
   control means for sensing the angle between the axis of said object and the direction of said radiation and
   correspondingly angularly displacing the axis of said sail relative to the axis of said object with said displacement being in a direction to mitigate the tendency of said sail means to oscillate about the direction of said radiation.

2. An attitude control arrangement comprising:
   an object which is desired to be maintained in a predetermined orientation relative to a source of electromagnetic radiation;
   radiation sail means coupled to control the orientation of said object for applying thereto an attitude altering force in response to transaxial impingement of radiation from said source;
   means associated with said sail means for detecting angular discrepancy between the axis of said sail means and the direction of said radiation and
   angularly displacing the axis of said sail relative to the axis of said object with said displacement being in a direction to reduce said angular discrepancy and thereby mitigate the tendency of said sail means to oscillate about the direction of said radiation.

3. In combination:
an object having an axis which is to be desired to be maintained at a predetermined angular orientation with respect to a radiation line from said object to a source of electromagnetic radiation;
sail means for applying torques to said object in response to transaxial impingement of radiation from said source, said sail means having a tendency to oscillate between opposite angularly displaced orientations relative to said radiation line;
sensing means for providing a signal corresponding to the degree of misalignment of said object, and
anti-hunt control means responsive to said signal for angularly displacing said sail means relative to the axis of said object with the angular displacement of said sail means being in a direction to make the misalignment of said sail means lead the misalignment of said object as a function of time, thereby alleviating said tendency to oscillate.

4. In a space vehicle of the class described:
a payload having an axis which is desired to be maintained substantially in alignment with solar radiation illuminating the vehicle;
a solar sail having an axis of symmetry and including a surface adapted to receive said radiation and responsive to transaxial radiation pressure for generating attitude controlling torques which vary as a function of the angle between said rays and said axis of symmetry;
boom means for supporting said sail at a predetermined distance from the center of inertia of said payload and
a thermally sensitive linkage associated with a portion of said boom means for interconnecting said sail with said payload and enabling variation of the angle between the axes thereof, said linkage having portions which are exposed to solar radiation to an extent which varies in proportion to the misalignment of the payload axis and which expands in response to said radiation in a manner to reduce the angular misalignment of said sail means, whereby the misalignments of the sail and the payload both vary as similar functions of time but with the sail misalignment being phase-shifted to lead the payload misalignment.

5. The apparatus of claim 4 in which said thermally sensitive linkage comprises a pair of axially spaced insulative material plates and at least one pair of metallic members extending in nonparallel relation between said plates with said metallic members being constructed and arranged to differently expand in response to different illuminations and to thereby alter the angle between said insulative material plates.

6. In combination in a space vehicle:
an object having an axis which is desired to be maintained substantially aligned with rays extending from a source of electromagnetic radiation to said object;
radiation sail means responsive to transaxial electromagnetic radiation pressure for applying rotational forces to said object as a function of the angle between said rays and the axis of said sail means;
radiation sensing means for generating an error signal which varies as a function of the degree of misalignment of said object and said rays;
flexible attachment means for interconnecting said object with said sail means and enabling variation of the inter-axis angle between the axes thereof; and
control means for utilizing said error signal to proportionally vary said inter-axis angle in a manner such that the misalignment of said object, as a function of time, lags behind the time-function misalignment of said sail means with said lag being dependent upon the rotational velocity of said object.

7. In a space vehicle:
a body desired to be held substantially in a selected orientation relative to the direction of solar radiation impinging thereon and which is subject to misorientation as a result of gravitational torques and the like, and
a solar radiation pressure attitude control system associated with said body for applying reorienting torques thereto;
said system including means for intercepting a portion of said solar radiation and providing forces dependent upon the aggregate photon pressure of the intercepted radiation, a temperature sensitive actuator to control the effective radiation intercepting area of said last-mentioned means, and shade means casting a shadow over at least a portion of said actuator for varying the solar heating of the same as a function of the misorientation of said body.

8. In a space vehicle:
a body desired to be held substantially in a selected orientation relative to the direction of solar radiation impinging thereon and which is subject to misorientation as a result of gravitational torques and the like, and
a solar radiation pressure attitude control system associated with said body for applying reorienting torques thereto,
said system including vane means for receiving a portion of said radiation and exerting reorienting torques on said body dependent upon the aggregate photon and proton pressure of the intercepted rays,
heat sensitive actuator means arranged to vary the angular relationship between a pair of members in proportion to heat energy input to the actuator means for varying the effective radiation intercepting area of said vane means and thereby varying said reorienting torques, and
sun shade means, carried by said body in a position such that the same casts a shadow over at least a portion of said actuator means, for varying the heat energy input to said actuator means as a function of the orientation of said body.

9. In a space vehicle:
a body desired to be held at a preselected orientation relative to light falling thereon;
sail means for applying torques to said body in proportion to the angle between said sail means and the light rays;
an angularly adjustable linkage connecting said body with said sail means for controlling sand angle; and
temperature sensitive means, which intercepts a portion of said light and is heated thereby to an extent dependent upon the angular misorientation of said body, for varying said angle as a function of the heating effect of the intercepted light.

10. In a space vehicle:
a body desired to be held in a predetermined orientation relative to a beam of light;
a sail for applying attitude altering torques to said body in accordance with a function of the misorientation of same;
a thermomechanical actuator arranged to vary the angular position of said sail relative to said body as a function of the actuator temperature; and
means carried in a position such that the same normally casts a shadow over at least a portion of said actuator for controlling the temperature of said actuator as a function of the misorientation of said body.

11. In combination in a space vehicle:
a main spacecraft body which is desired to be maintained at a predetermined angular orientation with respect to the sun-line from said body to the sun;
means including a plurality of solar radiation intercepting vanes for generating attitude controlling forces in response to the pressure of solar radiation impinging on said vanes, with the force provided by each vane being dependent upon the angular position of the particular vane relative to said sun-line;

support means mechanically attaching said vanes to said spacecraft body and at a distance therefrom at least of the order of the dimensions of said body so that each vane is capable of applying substantial attitude adjusting torques to said body; and thermally responsive control means associated with at least one of said vanes for detecting misorientation of said body with respect to said sun-line and adjusting the angular position of said vanes in a manner such that the same provide torques for positively stable restoration of said body to the desired angular orientation.

12. In a solar system having a sun, a space vehicle comprising:

a main spacecraft body which is desired to be maintained substantially at a predetermined angular orientation with respect to the sun-line from said body to said sun and which is subject to misorientation as as result of gravitational eccentricities, solar radiation pressures, and the like;

solar sail means for applying torques to said body in response to the radiation pressure of solar radiation impinging on said sail means, said sail means being connected to said spacecraft body through an angularly adjustable linkage for variation of the angular position of said sail means with respect to a predetermined axis of said spacecraft body; and thermally sensitive means responsive to the angular relation between said predetermined axis and impinging solar rays for controlling said angular position of said sail means.

13. In a space vehicle:

a main spacecraft body which is desired to be held substantially in a predetermined orientation relative to the direction of the rays in a radiant energy flux field and which is subject to misorientation as a result of gravitational torques, meteorite impingements, radiation pressures and the like, and a radiation pressure attitude control system associated with said body, said system including a plurality of radiation intercepting vanes arranged to intercept controllably variable magnitudes of the ambient radiation for exerting reorienting torques on said body in proportion to the aggregate photon and proton pressure of said rays, with the amount of radiation intercepted being dependent upon the angular position of the particular vane relative to said direction of the rays, support means attaching each of said vanes to said body and at a distance therefrom at least of the order of the dimensions of said body so that each vane is operative to generate a torque at least as great as the force exerted by the radiant energy impinging thereon, a heat sensitive actuator arranged to vary the angle between said support means and at least one of said vanes in proportion to heat energy input to the actuator for varying said angular position and thereby controlling the amount of radiation intercepted by the vane, and a sun shade carried by said body in a position such that the same casts a shadow over at least a part of said actuator for varying said heat energy input as a function of the orientation of said body relative to said rays.

References Cited by the Examiner

UNITED STATES PATENTS 3,028,119   4/1962   Coble _____ 244—14

OTHER REFERENCES

A.R.S. Journal, vol. 29, No. 5, May 1959, pages 371–373.

FERGUS S. MIDDLETON, *Primary Examiner.*